United States Patent
Shmatko et al.

(10) Patent No.: US 11,570,096 B2
(45) Date of Patent: Jan. 31, 2023

(54) ISOLATING TIME SYNCHRONIZATION TRAFFIC USING VIRTUALIZATION

(71) Applicant: Equinix, Inc., Redwood City, CA (US)

(72) Inventors: Vadim Shmatko, Mountain View, CA (US); Ankur Sharma, Sunnyvale, CA (US); Xin Wang, Milpitas, CA (US); Anirvan Das, Fremont, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 17/211,346

(22) Filed: Mar. 24, 2021

(65) Prior Publication Data

US 2021/0306262 A1    Sep. 30, 2021

Related U.S. Application Data

(60) Provisional application No. 62/994,277, filed on Mar. 24, 2020.

(51) Int. Cl.
*H04J 3/06* (2006.01)
*H04L 12/46* (2006.01)
(Continued)

(52) U.S. Cl.
CPC .......... *H04L 45/586* (2013.01); *H04J 3/0667* (2013.01); *H04L 12/4633* (2013.01); *H04L 12/4641* (2013.01); *H04L 45/745* (2013.01)

(58) Field of Classification Search
CPC .............. H04J 3/0667; H04L 12/4633; H04L 12/4641; H04L 12/66; H04L 45/586;
(Continued)

(56) References Cited

U.S. PATENT DOCUMENTS 9,886,267 B2    2/2018    Maheshwari et al.
9,948,552 B2    4/2018    Teng et al.
(Continued)

OTHER PUBLICATIONS

IEEE-SA Standards Board, Standard for a Precision Clock Synchronization Protocol for Networked Measurement and Control Systems, IEEE Std 1588TM-2008, Instrumentation and Measurement Society, New York, New York, Jul. 24, 2008, 289 pp.
(Continued)

*Primary Examiner* — Alpus Hsu
(74) *Attorney, Agent, or Firm* — Shumaker & Sieffert, P.A.

(57) ABSTRACT

This disclosure describes techniques for providing customer isolation of time synchronization traffic using virtualization. For example, a method includes receiving, by a computing device, an Internet protocol (IP) address of a customer network of a plurality of customer networks connected to a cloud exchange executed by the computing device; configuring, by the computing device, a time synchronization server connected to the cloud exchange with a Virtualized Local Area Network (VLAN) associated with the IP address of the customer network, the time synchronization server comprising a plurality of instances that provide a time synchronization service; and configuring, by the computing device, the time synchronization server with a Virtual Routing and Forwarding (VRF) or network namespace for the VLAN, wherein the VRF or network namespace includes a route to send time synchronization traffic between the customer network and a particular instance of the plurality of instances that provide the time synchronization service.

17 Claims, 7 Drawing Sheets

(51) Int. Cl.
   *H04L 12/713* (2013.01)
   *H04L 12/741* (2013.01)
   *H04L 45/586* (2022.01)
   *H04L 45/745* (2022.01)

(58) Field of Classification Search
   CPC ........... H04L 45/745; H04L 2012/5617; H04L 2012/5618
   See application file for complete search history.

(56) References Cited

U.S. PATENT DOCUMENTS

| | | | | |
|---|---|---|---|---|
| 9,967,350 | B2* | 5/2018 | Rao | H04L 41/0813 |
| 10,015,268 | B2 | 7/2018 | Rao | |
| 10,021,197 | B2* | 7/2018 | Rao | H04L 12/4641 |
| 10,027,768 | B2* | 7/2018 | Rao | H04L 41/0806 |
| 10,237,355 | B2* | 3/2019 | Rao | H04L 45/64 |
| 10,250,699 | B2* | 4/2019 | Rao | H04L 67/1097 |
| 10,341,184 | B2* | 7/2019 | Harneja | H04L 41/0866 |
| 10,411,996 | B2* | 9/2019 | Pani | H04L 45/48 |
| 10,491,462 | B1* | 11/2019 | Wagner | H04L 41/0803 |
| 10,536,337 | B2* | 1/2020 | Harneja | H04L 41/12 |
| 10,554,477 | B2* | 2/2020 | Nazar | H04L 43/06 |
| 10,554,483 | B2* | 2/2020 | Nagarajan | H04L 12/4641 |
| 2019/0379572 | A1* | 12/2019 | Yadav | H04L 41/046 |
| 2020/0007495 | A1* | 1/2020 | Balamurugan | H04L 61/2567 |
| 2020/0007582 | A1* | 1/2020 | Dixit | H04L 41/22 |
| 2021/0211360 | A1* | 7/2021 | Ramlall | G06N 3/08 |

OTHER PUBLICATIONS

Mills, et al., "Network Time Protocol Version 4: Protocol and Algorithms Specification," Internet Engineering Task Force (IETF), RFC 5905, Jun. 2010, 110 pp.

Shankarkumar, et al., "Precision Time Protocol Version 2 (PTPv2) Management Information Base," Internet Engineering Task Force (IETF), RFC 8173, Jun. 2017, 64 pp.

U.S. Appl. No. 16/438,310, filed Jun. 11, 2019, naming inventors Ozarkar et al.

U.S. Appl. No. 17/071,420, filed Oct. 15, 2020, naming inventors Kamen et al.

Kernen et al., "Using PTP for Time & Frequency in Broadcast Applications," EBU Technology & Innovation, Technical Review: Part 3: Network design for PTP, Dec. 2019, 11 pp.

International Search Report and Written Opinion of International Application No. PCT/US2021/023894, dated Jun. 16, 2021, 14 pp.

"Cisco Nexus 7000 Series NX-OS System Management Configuration Guide," Cisco Systems, Inc., Release 5.x OL-20635-03, Retrieved Jun. 7, 2021 from: https://www.cisco.com/c/en/us/td/docs/switches/datacenter/sw/5_x/nx-os/system_management/configuration/guide/sm_nx_os_cg.html, May 25, 2010, 370 pp.

"Cisco Nexus 7000 Series Virtual Device Context Configuration Guide," Cisco Systems, Inc., Retrieved Jun. 7, 2021 from: https://www.cisco.eom/c/en/us/td/docs/switches/datacenter/nexus7000/sw/vdc/config/cisco_nexus7000_vdc_config_guide_8x.html, Aug. 13, 2019, 104 pp.

"MiFID II," ESMA, Markets in Financial Instruments Directive II—European Securities and Markets Authority, Retrieved Jan. 20, 2020, from: https://www.esma.europa.eu/policy-rules/mifid-ii-and-mifir, Feb. 18, 2018, 4 pp.

"Architecture and Requirements for Packet-Based Time and Phase Distribution," ITU-T, G.8275/Y.1369, Aug. 2017, 38 pp.

"Rule 613 (Consolidated Audit Trail)," Securities and Exchange Commission, Retrieved Feb. 3, 2020, from: https://www.sec.gov/divisions/marketreg/rule613-info.htm, Apr. 19, 2019, 5 pp.

International Preliminary Report on Patentability from International Application No. PCT/US2021/023894 dated Oct. 6, 2022, 12 pp.

\* cited by examiner

ISOLATING TIME SYNCHRONIZATION TRAFFIC USING VIRTUALIZATION

This application claims the benefit of U.S. Provisional Patent Application No. 62/994,277, filed on Mar. 24, 2020, the contents of which is incorporated by reference herein in its entirety.

TECHNICAL FIELD

The disclosure relates to time synchronization.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The typical synchronization system has one layer of master devices with other end devices (also referred to as "slave" devices, "replica" devices, or "follower" devices) connected to at least one master device. Master devices are connected to the more precise sources of timestamps. In some implementations, master devices may belong to a service provider and can be designed to support precise time processing, while end devices may belong to the service client and receive timestamp offsets from master devices. These master and end devices can be chosen arbitrarily or assigned by the network.

In many applications, including but not limited to financial, scientific, military, and gaming industries, time synchronization may be beneficial. For instance, such knowledge would be used to define trade orders in high-frequency trading systems and gamers response in multi-user games.

SUMMARY

In general, the disclosure describes techniques for providing customer isolation of time synchronization traffic using virtualization. For example, end devices may access a time synchronization service using an exchange, such as a cloud-based services exchange (referred to herein as "cloud exchange"). For example, a cloud exchange provides a resilient and independent cloud-based services exchange by which cloud-based services customers ("cloud customers" or simply "customers") and/or cloud-based service providers ("cloud providers"), connect to receive and provide, respectively, cloud services. One such cloud service may include time synchronization services provided by time synchronization protocols, such as network time protocol (NTP) or precision time protocol (PTP), to synchronize the clocks of devices throughout a computer network. As one example, time synchronization protocols such as NTP or PTP describes a master computing device (e.g., time synchronization server) that acts as a reference clock (e.g., using a hardware clock of the master computing device) to provide reference timing signals to client computing devices that synchronize their system time to the system time of the master computing device.

In accordance with the techniques described in this disclosure, a single master computing device, such as a time synchronization server (e.g., PTP master), is configured with multiple instances of the time synchronization service for a plurality of client computing devices (including where the customers are different customer entities), regardless of whether the plurality of customers have overlapping IP addresses.

As one example, the disclosure describes a method including: receiving, by a programmable network platform executed by a computing device, an Internet protocol (IP) address of a customer network of a plurality of customer networks connected to a cloud exchange administered by the programmable network platform; configuring, by the programmable network platform, a time synchronization server connected to the cloud exchange with a Virtualized Local Area Network (VLAN) associated with the IP address of the customer network, the time synchronization server comprising a plurality of instances that provide a time synchronization service; and configuring, by the programmable network platform, the time synchronization server with a Virtual Routing and Forwarding (VRF) or network namespace for the VLAN, wherein the VRF or network namespace includes a route to send time synchronization traffic between the customer network and a particular instance of the plurality of instances that provide the time synchronization service.

As another example, the disclosure describes a computing device comprising: one or more computer processors; and a memory comprising instructions that when executed by the one or more computer processors cause the one or more computer processors to: receive an Internet protocol (IP) address of a customer network of a plurality of customer networks connected to a cloud exchange; configure a time synchronization server connected to the cloud exchange with a Virtualized Local Area Network (VLAN) associated with the IP address of the customer network, the time synchronization server comprising a plurality of instances that provide a time synchronization service; and configure the time synchronization server with a Virtual Routing and Forwarding (VRF) or network namespace for the VLAN, wherein the VRF includes a route to send time synchronization traffic between the customer network and a particular instance of the plurality of instances that provide the time synchronization service.

As another example, the disclosure describes an interconnection system comprising: a plurality of customer networks connected to a cloud exchange; a time synchronization server connected to the cloud exchange, the time synchronization server comprising: a plurality of instances that provide a time synchronization service; a Virtualized Local Area Network (VLAN) associated with an Internet protocol (IP) address of a particular customer network of the plurality of customer networks; and a Virtual Routing and Forwarding (VRF) or network namespace for the VLAN, wherein the VRF or network namespace includes a route to send time synchronization traffic between the particular customer network and a particular instance of the plurality of instances that provide the time synchronization service.

In this way, a single master computing device, e.g., a PTP master, may act as a reference clock to provide reference timing signals to a plurality of client computing devices, which provides a greater level of timing precision (e.g., by using a single hardware clock) in contrast to multiple connections to multiple master computing devices. Moreover, by configuring a VLAN and VRF or network namespace for each of a plurality of customers, the customers can, regardless of whether the customers have overlapping IP addresses, all connect to a single master computing device, which provides for more scalability.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
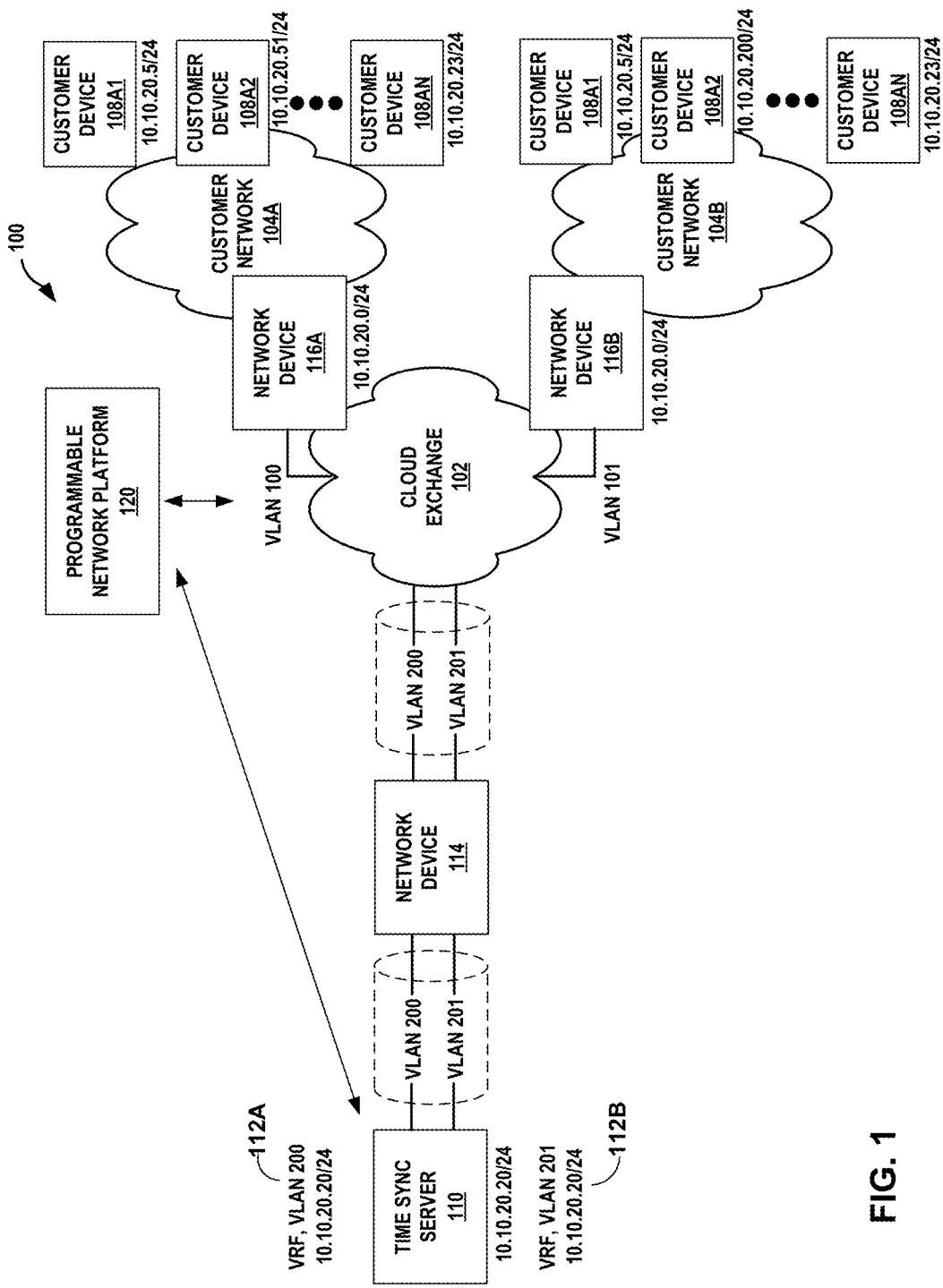
FIG. 1 is a block diagram of an example network system providing a time synchronization service using a cloud exchange, in accordance with one or more techniques described in this disclosure.

In general, techniques are described for time synchronization services using an exchange, in accordance with techniques described in this disclosure.

For the purposes of this disclosure, a time synchronization system or a system indicates a complex set of devices, algorithms, programs, modules, and components which allow the execution of time synchronization operations.

For the purposes of this disclosure, a device clock indicates an internal clock of the device. A device can have a single device clock or more than one device clock, including one or more of a Network Interface Card (NIC) card clock, a Graphics Processing Unit (GPU) clock, a central processing unit (CPU) clock, or other clocks.

For the purposes of this disclosure, a system clock indicates a clock associated with the time synchronization system. The system clock may be a high precision clock which provides a precise time signal and generates precise timestamps, such as a clock on a GPS. The time synchronization system may have more than one system clock.

For the purposes of this disclosure, a timestamp indicates an individual time signal measurement registered by a time measurement device. For the purposes of this disclosure, a device timestamp indicates a timestamp generated by a device. For the purposes of this disclosure, a system timestamp indicates a timestamp computed by the time synchronization system. For the purposes of this disclosure, a timestamp offset (also referred to herein as a "time synchronization offsets" and an "offset") indicates a difference between two timestamps. For instance, the timestamp offset may be calculated as a difference between the device timestamp and the system timestamp.

For the purposes of this disclosure, the network time protocol (NTP) is a networking protocol for clock synchronization between computer systems over packet-switched, variable-latency data networks. For the purposes of this disclosure, the precision time protocol (PTP) is a protocol used to synchronize clocks throughout a computer network.

For the purposes of this disclosure, a switch indicates a computer networking device that connects devices together on a computer network by using packet switching to receive, process, and forward data to the destination device. For the purposes of this disclosure, a PTP switch indicates a switch that supports the PTP standard protocol and allows the receipt, processing, and forwarding of timestamps to the destination devices. For the purposes of this disclosure, an NTP Switch indicates a switch that supports the NTP standard protocol and allows the receipt, processing, and forwarding of timestamps to the destination devices. For the purposes of this disclosure, a master switch indicates a special device that allows the receipt, processing and forwarding of time signal from a GPS antenna. For the purposes of this disclosure, a system state indicates a set of parameters that allows the estimation of how loaded and "ready for time synchronization" a system is.

For the purposes of this disclosure, a master computing device (also known as "master device," "primary device" or a "leader" device) indicates a special type of device that gets time synchronization data from other master devices or intelligent engines deployed inside the synchronization system, such as a GPS module in communication with a GPS. For the purposes of this disclosure, an end device (also known as a "slave" device, a "replica" device, or a "follower" device, all of which may be used interchangeably throughout this disclosure) indicates a name of all non-master devices that is typically connected to one or more master devices.

Modern technology utilizes virtualized resources, distributed systems and edge computing, each of which increase the need for precise timing in order to realize the performance benefits. Two major vectors currently drive the need for sub-microsecond timing. The first vector is that new regulations and industry standards mandate greater accuracy, reliability, resiliency, transparency and traceability for time and synchronization. These standards include Markets in Financial Instruments Directive II—European Securities and Markets Authority ("MiFID II—ESMA", Finance), G.8275—International Telecommunications Union ("ITU", Telecommunications), Consolidated Audit Trail—Securities and Exchange Commission Rule 613 ("CAT—SEC", Finance), and C37.238-2011—Institute of Electrical and Electronics Engineers ("IEEE", Power).

A second vector driving the need for is the amount of emerging applications, business models, and use cases requiring more stringent timing and synchronization as a foundational component. These include long-term evolution (LTE), Advanced Pro, & 5G frequency and phase synchronization (Telecommunications), globally distributed databases that use time stamping for strict consistency (Enterprise systems), distributed ledger (Blockchain) and high-frequency trading granular chain of custody records (Finance and Enterprise systems), transportation or logistics synchronization for safety-critical applications (Enterprise systems, e.g. drones, autonomous vehicles), industrial automation or Internet of Things component synchronization and integration (Enterprise systems), and critical infrastructure protection and a national preparedness mandate for a viable backup to GPSs (Federal).

Highly accurate timing is a foundational component for high frequency trading in order to create trustworthy records, as well as for emerging applications such as global distributed databases, distributed ledgers, and autonomous vehicles. Using the techniques described herein, a datacenter or cluster may achieve sub-microsecond precision, and may be easily accessible and consumed at the intersection of customer applications, networks, and cloud on a global scale.

One example implementation environment for the techniques described herein is within one or more data centers. Data centers may house multiple different types of devices, each owned by different entities, but each of the devices may be linked inside this overall data center structure. Some devices within the data center may exchange data with other devices in the same data center but may also exchange data with devices located in data centers in different geographic or metropolitan areas. As such, data centers may implement the techniques described herein to synchronize the clocks efficiently and precisely on the devices within the same data center or devices of different data centers. In this way, the techniques described herein may be implemented as a downloadable software plugin on customer equipment in a data center that enables a device in the data center to perform the time synchronization processes as described herein. The techniques described herein may balance multiple characteristics, including scalability, versatility, precision, cost, security, and redundancy.

FIG. 1 is a conceptual diagram of an example interconnection system 100 providing a time synchronization service using an exchange (e.g., cloud exchange), in accordance with one or more techniques described in this disclosure. Interconnection system 100 provides a geographically distributed, Precision Timing Service (PTS) solution, which may extend locally, regionally, or globally. The design may be built on precision clocks and advanced algorithms to deliver accuracy to microseconds and, in some cases, on the order of nanoseconds while utilizing delivery mechanisms including White Rabbit, PTP (Precision Time Protocol), NTP (Network Time Protocol), software clients, and IP or Ethernet distribution through E-Sync Mechanisms.

FIG. 1 includes a cloud exchange 102 that provides resilient and independent cloud-based services exchange by which cloud-based services customers ("cloud customers") and/or cloud-based service providers ("cloud providers") connect to receive and provide, respectively, cloud services. Cloud exchange 102 provides customers of the exchange, e.g., enterprises, network carriers, network service providers, and Software as a Service (SaaS) customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 102 allows private networks of any customer to be directly cross-connected to any other customer at a common point, thereby allowing direct exchange of network traffic between the networks of the customers.

In this example, cloud customer network 104A operating computing devices 108A1-108AN (collectively, "computing devices 108A") and cloud customer network 104B operating computing devices 108B1-108BN (collectively, "computing devices 108B") connect to cloud exchange 102 to receive services, such as a time synchronization service provided by time synchronization server 110. Cloud exchange 102 may provide one or more cloud exchange points (as further described in FIG. 2), each representing, for example, a data center geographically located within the same metropolitan area ("metro-based," e.g., Silicon Valley, California; New York City, N.Y.; Dallas, Tex.; Chicago, Ill.; etc.). As used herein, reference to a "cloud exchange" or "cloud-based services exchange" may refer to a cloud exchange point. A cloud exchange provider may deploy instances of cloud exchange 102 in multiple different metropolitan areas, each instance of cloud exchange 102 having one or more cloud exchange points.

Cloud exchange 102 includes network infrastructure and an operating environment by which computing devices 108A of customer network 104A and computing devices 108B of customer network 104B receive time synchronization services provided by time synchronization server 110. In this example, network infrastructure of cloud exchange 102 may include one or more network devices, e.g., network device 114, to provide customer networks 104A and 104B (collectively, "customer networks 104" or "customers 104") with access to time synchronization service provided by time synchronization server 110. Network device 114 may represent a router or switch that supports time synchronization protocols, such as PTP or NTP, that allows the receipt, processing, and forwarding of timestamps to the destination devices.

Computing devices 108A and 108B (collectively, "computing devices 108") may be computing devices of corresponding customer networks co-located within the corresponding data center of one of cloud exchange points, or customer networks that receive services via transit network service providers (NSPs) (not shown in FIG. 1). In this example, computing devices 108A may access cloud exchange 102 via network device 116A. Similarly, computing devices 108B may access cloud exchange 102 via network device 116B. Network devices 116A and 116B may represent an edge network device, such as a router or switch.

In the example of FIG. 1, cloud exchange 102 includes a programmable network platform 120 for dynamically programming cloud exchange 102 to responsively and assuredly fulfill service requests that encapsulate business requirements for services provided by cloud exchange 102. One such service includes a time synchronization service provided by time synchronization server 110, coupled to (or colocated in) the cloud exchange 102. The programmable network platform 120 may, as a result, orchestrate a business-level service to time synchronization server 110 according to well-defined service policies, quality of service policies, service level agreements, and costs, and further according to a service topology for the business-level service.

The programmable network platform 120 enables the cloud service provider that administers the cloud exchange 102 to dynamically configure and manage the cloud exchange 102 to, for instance, facilitate virtual connections for services delivery from time synchronization server 110 to one or more customer devices 108. The cloud exchange 102 may enable customers to bypass the public Internet to directly connect to time synchronization server 110 so as to improve performance, reduce costs, increase the security and privacy of the connections, and leverage cloud computing for additional applications. In this way, enterprises, network carriers, and SaaS customers, for instance, can at least in some aspects integrate cloud services, such as the time synchronization services, with their internal applications as if such services are part of or otherwise directly coupled to their own data center network.

Programmable network platform 120 may represent an application executing within one or more data centers of the cloud exchange 102 or alternatively, off-site at a back office or branch of the cloud provider (for instance). Programmable network platform 120 may be distributed in whole or in part among the data centers, each data center associated with a different cloud exchange point to make up the cloud exchange 102. Although shown as administering a single cloud exchange 102, programmable network platform 120 may control service provisioning for multiple different cloud exchanges. Alternatively or additionally, multiple separate instances of the programmable network platform 120 may control service provisioning for respective multiple different cloud exchanges.

In the example of FIG. 1, cloud exchange 102 provides customers 104 with access to a time synchronization service that allows precise and accurate synchronization of time with devices throughout a computer network. The time synchronization service may support both the NTP and PTP protocols. Further information with respect to NTP is provided in "Network Time Protocol Version 4: Protocol and Algorithms Specification," RFC 5905, Internet Engineering Task Force (IETF), June 2010, available at https://tools.ietforg/html/rfc5905, the entire contents of which is incorporated by reference herein. Further information with respect to PTP is provided in "1588-2008—IEEE Standard for a Precision Clock Synchronization Protocol for Networked Measurement and Control Systems," Jul. 24, 2008, and "Precision Time Protocol Version 2 (PTPv2) Management Information Base," RFC 8173, IETF, June 2017, available at https://tools.ietforg/html/rfc8173, the entire contents of each of which is incorporated by reference herein.

In these and other examples, the time synchronization service may be configured by a programmable network platform 120 of a cloud exchange, e.g., cloud exchange 102. One example of a time synchronization service in a cloud exchange system is provided in U.S. application Ser. No. 16/438,310, entitled "TIMING SYNCHRONIZATION SERVICE AND DISTRIBUTION SYSTEM," filed Jun. 11, 2019, the entire contents of which are incorporated by reference herein.

There exist certain challenges in industries to provide accurate and precise time synchronization in a scalable manner. Typically, without the techniques described in this disclosure, a master computing device may implement, for example, a time synchronization protocol in unicast mode where each client computing device is configured with the IP address of the master computing device such that each of the client computing devices may individually connect to the master computing device. However, in these examples, the time synchronization server provides the time synchronization server with a single instance. If the time synchronization instance goes down, each of the connections to the master computing device also goes down.

In other examples, the master computing device may implement a time synchronization protocol in multicast mode where the master computing device may multicast a time synchronization message (e.g., timestamp) to a plurality of client devices. However, in some examples, if subnetworks of customers have overlapping IP addresses (e.g., where one or more client computing devices of a subnetwork have the same IP address of one or more client computing devices of another subnetwork), the master computing device is typically unable to accurately provide reference timing signals to the client computing devices.

In some examples, a client computing device may connect to one of a plurality of master computing devices through a process of discovering the master computing device using, for example, a best master clock algorithm. However, in these examples, the plurality of client computing devices may use different time synchronization servers, which uses different hardware clocks, thereby resulting in less accuracy across the different customer networks.

In accordance with the techniques of this disclosure, a single master computing device, e.g., time synchronization server 110, is configured with a plurality of instances of the time synchronization service, where time synchronization traffic for each instance is isolated from time synchronization traffic for other instances using virtualization.

When customer networks 104 are onboarded (i.e., connected) to cloud exchange 102, programmable network platform 120 may receive, from at least one of customer networks 104, an IP address that is to be used to receive the time synchronization service provided by time synchronization server 110. As one example, an administrator for customer network 104A may provide programmable network platform 120 with an IP address of 10.10.20.20/24 for customer network 104A. Similarly, an administrator for customer network 104B may provide programmable network platform 120 with an IP address of 10.10.20.20/24 for customer network 104B.

In response to receiving an IP address of a customer network 104, programmable network platform 120 may configure time synchronization server 110 with a VLAN for the IP address of a particular customer network. For example, programmable network platform 120 may configure VLAN 200 for the IP address of customer network 104A and VLAN 201 for the IP address of customer network 104B. In this way, each VLAN may provide connectivity to a corresponding customer network while maintaining traffic isolation from other customer networks.

Programmable network platform 120 may configure a Virtual Routing and Forwarding (VRF) instance (or in some examples, a network namespace) for a particular VLAN. For example, programmable network platform 120 may configure VRF 112A associated with VLAN 200 and VRF 112B associated with VLAN 201. Each of VRFs 112A and 112B (collectively, "VRFs 112") includes one or more routes to send time synchronization traffic (e.g., PTP or NTP messages) for its associated VLAN. For example, a VRF may send time synchronization traffic for a VLAN that is associated with a particular customer network and a particular instance of the time synchronization service.

For example, programmable network platform 120 may configure a timing process (e.g., timing daemon such as a PTP daemon) executed by time synchronization server 110 to provide a particular instance of the time synchronization service for a corresponding customer network. Each timing process (e.g., daemon) may use the same hardware clock (e.g., hardware clock of NIC) of time synchronization server 110. As further described below, VRF 112A may include a route to send time synchronization traffic between a first timing process (e.g., timing daemon 304A of FIG. 3A) providing a first instance of the time synchronization service and customer network 104A. Similarly, VRF 112B may include a route to send time synchronization traffic between a second timing process (e.g., timing daemon 304B of FIG. 3A) providing a second instance of the time synchronization service and customer network 104B.

In this way, by configuring a single master computing device, e.g., time synchronization server 110, with a plurality of time synchronization service instances, multiple customer networks may use the single master computing device as a reference clock (e.g., by utilizing a single hardware clock) to provide reference timing signals to a plurality of client computing devices of the customer networks, which provides a greater level of timing precision in contrast to multiple connections to multiple master computing devices (each having their own hardware clock and thus different timing signals). Moreover, by configuring a VLAN and VRF (or network namespace) for each of a plurality of customer networks, the customer networks can, regardless of whether the customer networks have overlapping IP addresses, all connect to a single master computing device that in essence makes the time synchronization service operate in unicast mode, which may provide for more precision and scalability.

Figure 2:
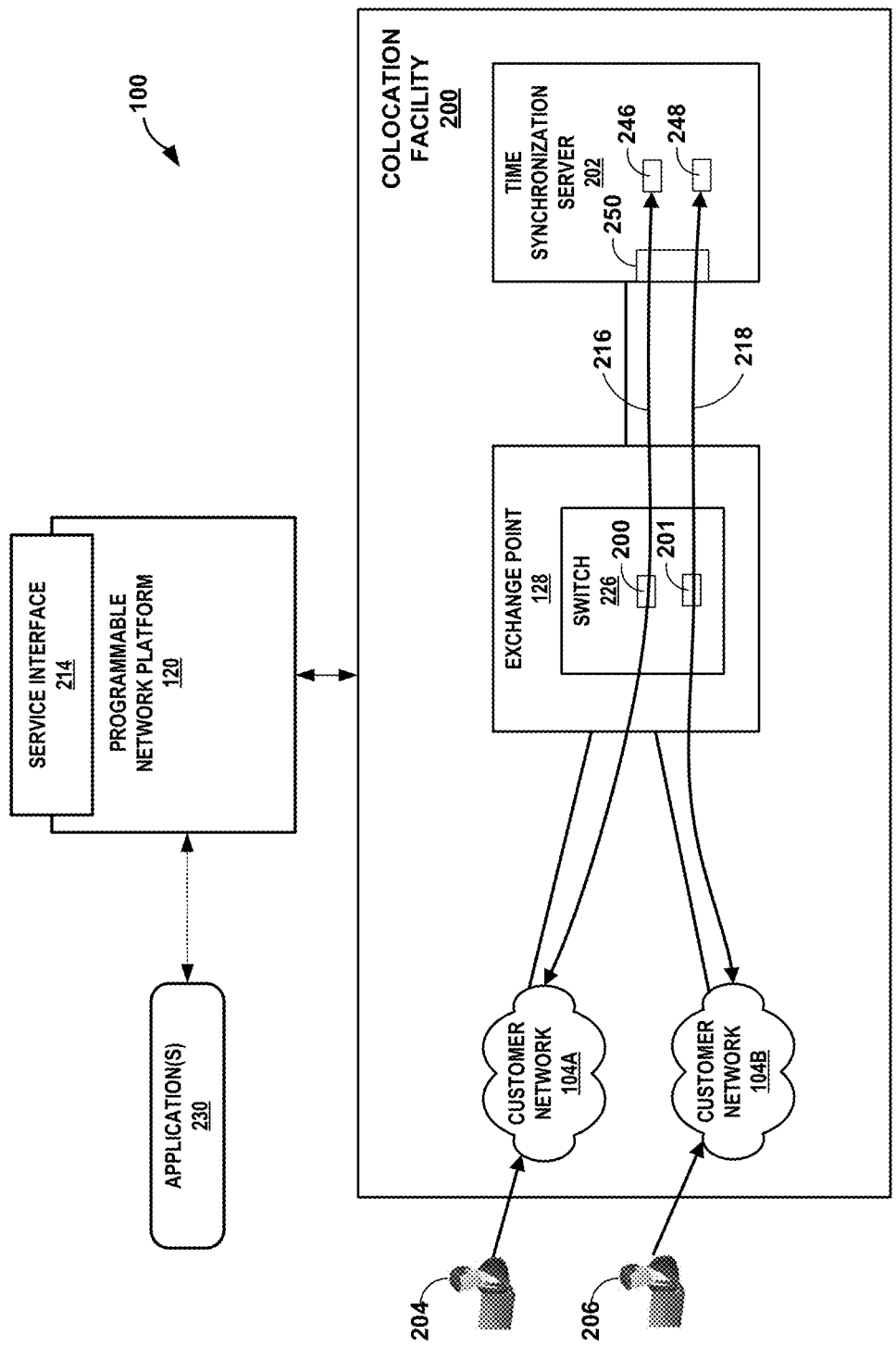
FIG. 2 is a block diagram that illustrates the network system of FIG. 1 in greater detail, in accordance with one or more techniques of the disclosure.

FIG. 2 is a block diagram that illustrates a cloud exchange of interconnection system 100 of FIG. 1 in greater detail. In the example of FIG. 2, colocation facility 200 may represent an example implementation of cloud exchange 102 of FIG. 1. Interconnection system 100 depicts an exchange point 128 within colocation facility 200, such as a data center or warehouse, that provides customer networks 104A and 104B, for instance, with access to a time synchronization service provided by time synchronization server 202. Although colocation facility 200 of FIG. 2 is illustrated with a single exchange point, colocation facility 200 may include a plurality of exchange points.

As used herein, the term "customer" may include a tenant of a colocation facility deployed by a colocation facility provider, whereby the customer purchases one or more of colocation, interconnection and/or other network services from the colocation facility provider. In some examples, a customer receives such services by colocating at the colocation facility 200 to, e.g. lease space and/or power to access services provided at colocation facility 200. In other examples, a customer may not be a physical tenant of a colocation facility, but may be connected virtually to the cloud exchange without requiring a physical presence in the colocation facility 200.

In colocation facility 200, space and power may be partitioned and leased to customer networks 104 in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) colocated in the colocation facility 200. Customer networks 104 may lease space within the colocation facility 200 in order to colocate with other tenants for improved efficiencies over independent facilities as well as to interconnect network equipment with the network equipment of other tenants/customers within the colocation facility 200 or campus for reduced latency/jitter and improved reliability, performance, and security versus transport networks, among other reasons. Colocation facility 200 may host numerous customers, e.g., customer networks 104, and their network, server, and/or storage gear. Each of customer networks 104 may have particular reasons for choosing to colocate at colocation facility 200, including capacity, geographical proximity, connecting to other customers, colocating with other customers, and price. Although FIG. 2 is shown with two customers, interconnection system 100 may include one or more additional customers colocated in (or virtually connected to) the colocation facility 200 to receive network services, such as a time synchronization service, from the colocation facility 200 provider.

Cloud customers operating computing devices 108 may receive cloud-based services directly via a layer 3 peering and physical connection to cloud exchange point 128 or indirectly via one of network service providers (not shown in FIG. 2) (also referred to as "carriers"). NSPs provide "cloud transit" by maintaining a physical presence within one or more of cloud exchange points and aggregating layer 3 access from one or more devices customer 108. NSPs may peer, at layer 3, directly with cloud exchange point 128 of colocation facility 200 and in so doing offer indirect layer 3 connectivity and peering to one or more customer devices 108 by which customers (e.g., that are operating customer devices 108) may obtain cloud services from colocation facility 200. Each cloud exchange point of colocation facility 200 is assigned a different autonomous system number (ASN). Each cloud exchange point is thus a next hop in a path vector routing protocol (e.g., BGP) path from cloud service providers to customer devices 108. As a result, each cloud exchange point may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers to customers. In other words, cloud exchange points may internalize the eBGP peering relationships that cloud service providers and customers would maintain on a pair-wise basis. Instead, a customer may configure a single eBGP peering relationship with a cloud exchange point and receive, via the cloud exchange point, multiple cloud services from one or more cloud service providers. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, one customer may have contracted with a cloud exchange provider for colocation facility 200 to directly access layer 3 cloud services via cloud exchange points. In this way, that customer receives redundant layer 3 connectivity to the cloud service provider. The contracts described above are instantiated in network infrastructure of the cloud exchange points by L3 peering configurations within switching devices of NSPs and cloud exchange points and L3 connections, e.g., layer 3 virtual circuits, established within cloud exchange points to interconnect cloud service provider networks to NSPs and customer networks, all having at least one port offering connectivity within one or more of the cloud exchange points.

In some examples, colocation facility 200 allows a corresponding one of customers of any NSPs or other cloud customers including a customer operating a customer device to be directly connected, via a virtual layer 2 (L2) or layer 3 (L3) connection to any other customer network and/or to any of CSPs, thereby allowing direct exchange of network traffic among the customer networks and CSPs. The virtual L2 or L3 connection may be referred to as a "virtual circuit."

NSPs may each represent a network service provider that is associated with a transit network by which network subscribers of the NSP may access cloud services offered by CSPs via the colocation facility 200. In general, customers of CSPs may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs via the colocation facility 200.

In this way, colocation facility 200 streamlines and simplifies the process of partnering CSPs and customers (via carriers NSPs or directly) in a transparent and neutral manner. One example application is a co-location and interconnection data center in which CSPs and NSPs and/or customers operating customer devices 108 may already have network presence, such as by having one or more accessible ports available for interconnection within the data center, which may represent cloud exchange points. This allows the participating NSPs, customers, and CSPs to have a wide range of interconnectivity options within the same facility. An NSP/customer may in this way have options to create many-to-many interconnections with only a one-time hook up to one or more cloud exchange points. In other words, instead of having to establish separate connections across transit networks to access different cloud service providers or different cloud services of one or more cloud service providers, colocation facility 200 allows customers to interconnect to multiple CSPs and cloud services.

Colocation facility 200 may provide one or more different types of interconnection services via network devices of network infrastructure between customer networks 104 colocated in colocation facility 200. For instance, colocation facility 200 may provide physical or "layer-1" (in the Open Systems Interconnection model (OSI Model)) interconnections between tenants of colocation facility 200. Physical interconnections may include physical cross-connects that are established by category 5 or 6 (cat 5/6) cables, coaxial cables, and/or fiber optic cables, for instance. In some examples, colocation facility 200 may provide data link or "layer-2" (in the OSI Model) interconnections between tenants of colocation facility 200. In some examples, colocation facility 200 that provides layer-2 interconnections may be referred to as an Ethernet Exchange, where Ethernet is the underlying layer-2 protocol. In some examples, colocation facility 200 may provide network and/or transport or "layer-3/4" (in the OSI Model) interconnections between tenants of colocation facility 200. In some examples, colocation facility 200 may provide layer-3/4 interconnections (referred to an Internet Exchange), where TCP/IP is the underlying layer-3/4 protocols. For example, colocation facility 200 may provide an Internet Exchange to allow routers (e.g., network devices 116 of FIG. 1) of tenants of colocation facility 200 to directly peer with other tenants of colocation facility 200 using a layer-3 routing protocol, such as Border Gateway Protocol, to exchange routes for facilitating layer-3 traffic exchange to provide private peering. In some examples, colocation facility 200 may provide indirect layer-3 routing protocol peering whereby each of customer networks 104 announces its layer-3 routes to an autonomous system (AS) deployed by the colocation facility provider within the colocation facility network infrastructure to provide private peering mediated by the AS. The AS may then relay these routes typically in conjunction with tunneling or other forwarding mechanisms to establish a connection to customer networks 104. In some examples, colocation facility 200 may provide indirect layer-3 routing protocol peering to facilitate service traffic exchange (referred to as a Cloud-based Services Exchange or, more simply, a Cloud Exchange). Additional description of exchanges are found in U.S. Pat. No. 9,948,552, filed Apr. 14, 2016, entitled "CLOUD-BASED SERVICES EXCHANGE," and U.S. Pat. No. 10,015,268, filed Jan. 20, 2016, entitled "MULTI-CLOUD, MULTI-SERVICE DATA MODEL," the entire content of each of which being incorporated by reference herein. Additional description of the interconnection services provided by exchanges is found in U.S. Pat. No. 9,886,267, filed Oct. 29, 2015, entitled "INTERCONNECTION PLATFORM FOR REAL-TIME CONFIGURATION AND MANAGEMENT OF A CLOUD-BASED SERVICES EXCHANGE," the entire content of which is being incorporated by reference herein. As used herein, an interconnection is an example of a network service provided by network devices of the network infrastructure.

In the example of FIG. 2, a time synchronization server 202 may provide a time synchronization service, such as in accordance with NTP or PTP. Time synchronization server 202 of FIG. 2 may represent an example of time synchronization server 110 of FIG. 1. In this example, time synchronization server 202 is colocated in colocation facility 200, but may in some examples be external to colocation facility 200 that is connected to a service provider (e.g., network service provider or carrier) that is colocated in colocation facility 200.

In the example of FIG. 2, exchange point 128 includes a network infrastructure and an operating environment by which customer networks 104 receive network services, such as the time synchronization service provided by time synchronization server 202. In some examples, the network infrastructure of exchange point 128 may include network devices such as, routers and/or switches, e.g., switch 226, to provide customer networks 104 with access to a time synchronization service provided by time synchronization server 202. Switch 226 may represent an example implementation of network device 114 of FIG. 1. The number of network devices within exchange point 128 is illustrated as a simplified example and may include any number of network devices to provide customer networks 104 with access to a time synchronization service of interconnection system 100. Each network device includes a number of resources and features to provide access to the time synchronization service. For example, a switch 226 may include network device resources for implementing features offered by the switch, such network device resources including control plane central processing unit ("CPU"), data plane CPU, control plane memory, data plane memory, ports, line cards, and other network device resources. A network device feature may include a logical component that provides support for a network service and utilizes hardware-based network device resources to implement the network service. For example, network device features may include virtual local area network (VLAN) support and other features supported by network devices to implement network services configured by an operator (either directly or via a configuration device such as a Software Defined Networking (SDN) controller).

In some examples, customers may request a time synchronization service from the colocation facility 200 provider via programmable network platform 120 ("PNP 120"). As described above, PNP 120 may represent an application executing within one or more data centers of interconnection system 100 or alternatively, off-site/remotely at a back office or branch of the colocation facility provider, for instance. Although shown as administering a single colocation facility 200, programmable network platform 120 may control service provisioning for multiple different colocation facilities. Alternatively, or additionally, multiple separate instances of the programmable network platform 120 may control service provisioning for respective multiple different colocation facilities. Programmable network platform 120 may include service interface 214 (or "service application programming interface (API)") that may exchange information with application(s) 230 to receive service requests, for instance. Service interface 214 defines the methods, fields, and/or other software primitives by which applications 230 may invoke programmable network platform 120.

Application(s) 230 represents at least one application that communicates with PNP 120 to request a time synchronization service for a customer network. Application(s) 230 represent client-side software for interfacing with PNP 120 and may include a customer portal, customer applications, and/or a console such as a command-line interface or graphical user interface. Users or clients of application(s) 230 may include customer networks 104, e.g., enterprise customers, cloud service and content providers, carriers, network service providers (NSPs), or other customers of colocation facility 200. Users of application(s) 230 may also include operators/administrators of the colocation facility 200 provider. In some examples, application(s) 230 and PNP 120 may represent different functions or modules of the same application.

In some examples, an administrator 204 (such as an operator or software agent) for customer network 104A may provide an IP address of customer network 104A via service interface 214 to programmable network platform 120. Similarly, administrator 206 for customer network 104B may provide an IP address of customer network 104B via service interface 214 to programmable network platform 120. In some examples, a single administrator may provide different IP addresses for different customer networks (e.g., for a primary and backup customer network, as further described in FIG. 4).

In response to receiving the IP address of customer network 104A, programmable network platform 120 configures, on time synchronization server 202, VLAN 200 associated with the subnet IP address of customer network 104A. Similarly, in response to receiving the IP address of customer network 104B, programmable network platform 120 also configures, on time synchronization server 202, VLAN 201 associated with the subnet IP address of customer network 104B. Programmable network platform 120 may assign VLAN 200 and VLAN 201 to a single physical port of time synchronization server 202 (referred to as "VLAN trunking"). To distinguish traffic on each of the VLANs, time synchronization traffic is tagged, e.g., with a VLAN ID associated with a corresponding VLAN. For example, when sending time synchronization traffic (e.g., a timestamp) to customer network 104A, time synchronization server 202 may add a VLAN ID associated with VLAN 200 to the time synchronization traffic. Similarly, when sending time synchronization traffic to customer network 104B, time synchronization server 202 may add a VLAN ID associated with VLAN 201 to the time synchronization traffic.

In some examples, switch 226 may receive time synchronization traffic from at least one of customer devices 108A of customer network 104A and add (or swap an existing VLAN ID such as VLAN 100 of FIG. 1) a VLAN ID associated with VLAN 200 to the time synchronization traffic to send the time synchronization traffic to a particular instance of the time synchronization service (e.g., timing daemon 304A). Similarly, switch 226 may receive time synchronization traffic from at least one of customer devices 108B of customer network 104B and add (or swap an existing VLAN ID such as VLAN 101 of FIG. 1) a VLAN ID associated with VLAN 201 to the time synchronization traffic to send the time synchronization traffic to a particular instance of the time synchronization service (e.g., timing daemon 304B).

Programmable network platform 120 may also configure a Virtual Routing and Forwarding (VRF) instance or network namespace for each of the VLANs to route time synchronization traffic between a particular customer network and particular instance of the time synchronization service provided by time synchronization server 202. For example, programmable network platform 120 may configure time synchronization server 202 with a VRF for VLAN 200 to send time synchronization traffic between customer network 104A and a first daemon (e.g., timing daemon 304A of FIG. 3A) providing a first instance 246 of the time synchronization service provided by time synchronization server 202. As one example, programmable network platform 120 may configure a VRF that includes a virtual interface of VLAN 200 that is assigned to a physical port of a network interface card (NIC) 250 of time synchronization server 202, wherein the virtual interface of VLAN 200 is mapped to a particular instance of the time synchronization service (e.g., timing daemon 304A of FIG. 3A). In this way, when the first daemon processes the first instance 246 of the time synchronization service and causes time synchronization server 202 to send a time synchronization message to customer network 104A, time synchronization server 202 may add the VLAN ID associated with VLAN 200 to the time synchronization traffic to send the traffic to customer network 104A.

Similarly, programmable network platform 120 may configure time synchronization server 202 with a VRF for VLAN 201 to send time synchronization traffic between customer network 104B and a second daemon (e.g., timing daemon 304B of FIG. 3A) providing a second instance 248 of the time synchronization service provided by time synchronization server 202. In this example, programmable network platform 120 may configure a VRF that includes a virtual interface of VLAN 201 that is assigned to a physical port of (NIC) 250 of time synchronization server 202, wherein the virtual interface of VLAN 201 is mapped to a particular instance of the time synchronization service (e.g., timing daemon 304B of FIG. 3A). In this way, when the second daemon processes the second instance 246 of the time synchronization service and causes time synchronization server 202 to send a time synchronization message to customer network 104B, time synchronization server 202 may add the VLAN ID associated with VLAN 201 to the time synchronization traffic to send the traffic to customer network 104B.

In this way, when switch 226 receives time synchronization traffic 216 from at least one of customer devices 108A of customer network 104A, switch 226 may add the VLAN ID associated with VLAN 200 to send the traffic toward the first daemon configured within time synchronization server 202. As one example, when switch 226 receives time synchronization traffic 216 with a VLAN ID associated with VLAN 100 from at least one of customer devices 108A of customer network 104A, switch 226 may translate the VLAN ID associated with VLAN 100 with the VLAN ID associated with VLAN 200 to send the traffic toward the first daemon configured within time synchronization server 202. Likewise, when switch 226 receives time synchronization traffic 218 from at least one of customer devices 108B of customer network 104B, switch 226 may add the VLAN ID associated with VLAN 201 to send the traffic to the second daemon configured within time synchronization server 202. As one example, when switch 226 receives time synchronization traffic 218 with a VLAN ID associated with VLAN 101 from at least one of customer devices 108B of customer network 104B, switch 226 may translate the VLAN ID associated with VLAN 101 with the VLAN ID associated with VLAN 201 to send the traffic toward the first daemon configured within time synchronization server 202. Traffic 216 and 218 may include PTP or NTP messages, more generally stated as time synchronization messages, containing timestamp and/or time offset information.

Figure 3A:
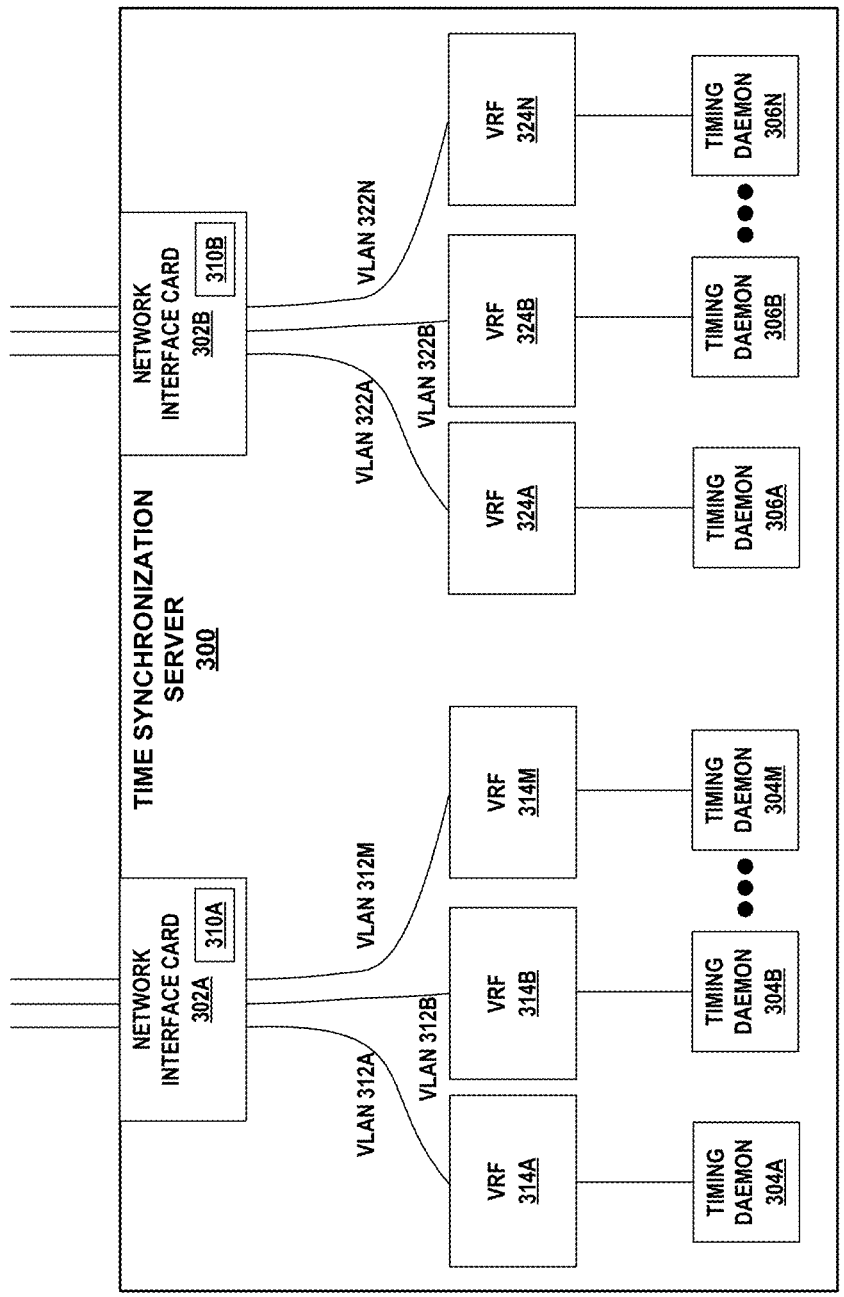
FIG. 3A is a block diagram illustrating an example of a time synchronization server in further detail, in accordance with one or more aspects of the techniques described in this disclosure.
Figure 3B:
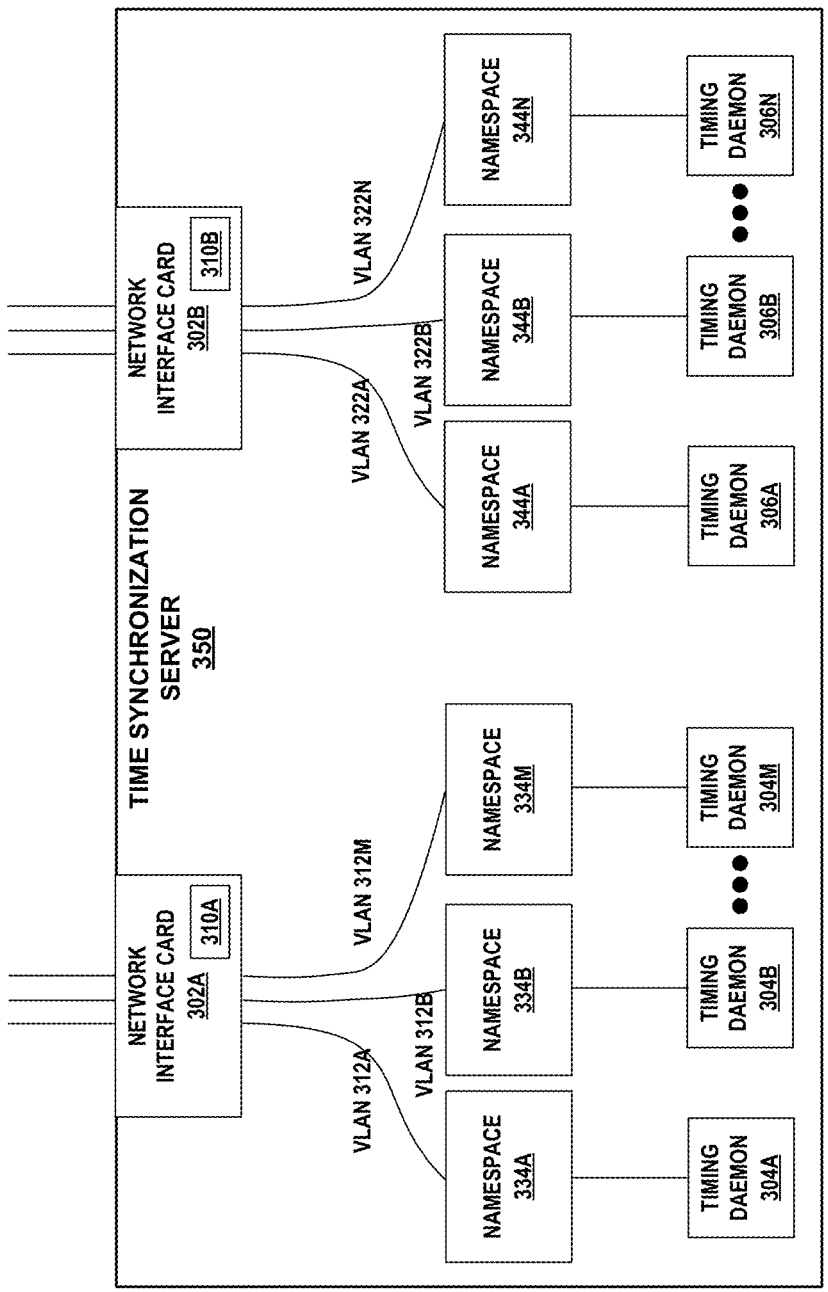
FIG. 3B is a block diagram illustrating another example of a time synchronization server in further detail, in accordance with one or more aspects of the techniques described in this disclosure.

As further described in FIGS. 3A and 3B, programable network platform 120 may employ a mix of VRFs and network namespaces, depending on what type of virtualization (including containerization) is desired.

FIG. 3A is a block diagram illustrating an example of a time synchronization server in further detail, in accordance with one or more aspects of the techniques described in this disclosure. In the example of FIG. 3A, time synchronization server 300 may represent an example implementation of time synchronization server 110 of FIG. 1 or time synchronization server 202 of FIG. 2 configured with a virtual routing and forwarding instance to route time synchronization traffic for a VLAN associated with a particular customer network and a particular instance of the time synchronization service.

In the example of FIG. 3A, time synchronization server 300 includes network interface cards ("NICs") 302A-302B (collectively, "NICs 302"). The example of FIG. 3A is merely an example and may include any number of NICs. In this example, NIC 302A is configured with a first set of VLANs including VLANs 314A-314M (collectively, "VLANs 314"). NIC 302B is configured with a second set of VLANs including VLANs 324A-324N (collectively, "VLANs 324"). Each of the VLANs is associated with a particular customer network of the cloud exchange that is requesting the time synchronization service.

A programmable network platform (e.g., programmable network platform 120 of FIGS. 1 and 2) may configure time synchronization server 300 with a VRF for each of the VLANs, where each of the VRFs includes one or more routes to send time synchronization traffic between a particular customer network and a particular instance of the time synchronization service. For example, VRF 314A includes a virtual interface of VLAN 312A that is assigned to a physical port of NIC 302A and is mapped to timing daemon 304A that provides a first instance of the time synchronization service. Similarly, VRF 314B includes a virtual interface of VLAN 312B that is assigned to the physical port of NIC 302A and is mapped to timing daemon 304B that provides a second instance of the time synchronization service. Likewise, VRF 314M includes a virtual interface of VLAN 312M that is assigned to the physical port of NIC 302A and is mapped to timing daemon 304M that provides an Mth instance of the time synchronization service.

The number of VLANs configured on NIC 302A is limited due to hardware constraints. As the number of customer networks connected to the cloud exchange continue to scale, additional network interface cards, e.g., NIC 302B, can be added to time synchronization server 300 and configured by the programmable network platform with one or more VLANs for the additional customer networks. For example, the programmable network platform may configure NIC 302B with VLANs for each of the additional customer networks and configures VRFs for the VLANs to route time synchronization traffic between instances of the time synchronization service and the additional customer networks. For example, VRF 324A includes a virtual interface of VLAN 322A that is assigned to a physical port of NIC 302B and is mapped to timing daemon 306A that provides an instance of the time synchronization service. Similarly, VRF 324B includes a virtual interface of VLAN 322B that is assigned to the physical port of NIC 302B and is mapped to timing daemon 306B that provides another instance of the time synchronization service. Likewise, VRF 324N includes a virtual interface of VLAN 322N that is assigned to the physical port of NIC 302B and is mapped to timing daemon 306N that provides an Nth instance of the time synchronization service.

Timing processes, e.g., timing daemons 304A-304M (collectively, "timing daemons 304"), may each provide an instance of the time synchronization service for a corresponding one of VLANs 312. Similarly, timing daemons 306A-306N (collectively, "timing daemons 306") may each provide an instance of the time synchronization service for a corresponding one of VLANs 322. Each of timing daemons 304 may use the same hardware clock, e.g., hardware clock 310A of NIC 302A, as a reference clock to provide reference timing signals to client computing devices that synchronize their system time to the system time of time synchronization server 300. Similarly, each of timing daemons 306 may use the same hardware clock, e.g., hardware clock 310B of NIC 302B, as a reference clock to provide reference timing signals to client computing devices that synchronize their system time to the system time of time synchronization server 300. Although hardware clock 310A and 310B are illustrated as a NIC clock, hardware clocks may include one or more of a Network Interface Card (NIC) clock, a Graphics Processing Unit (GPU) clock, a central processing unit (CPU) clock, or other hardware clocks.

FIG. 3B is a block diagram illustrating another example of a time synchronization server in further detail, in accordance with one or more aspects of the techniques described in this disclosure. In the example of FIG. 3B, time synchronization server 350 may represent an example implementation of time synchronization server 110 of FIG. 1 or time synchronization server 202 of FIG. 2 configured with a namespace to route time synchronization traffic for a VLAN associated with a particular customer network and a particular instance of the time synchronization service. The techniques of the disclosure described with reference to VRFs (e.g., as described in FIG. 3A) may likewise be applied to network namespaces, such as in the context of network containers (e.g., Kubernetes), as described below. A network namespace may provide containers with network isolation, where each of the containers include its own IP address, routing table, etc.

In the example of FIG. 3B, time synchronization server 350 is configured with namespaces, each including one or more routes to send time synchronization traffic between a particular instance of the time synchronization service and a particular customer network. In this example, a programmable network platform (e.g., programmable network platform 120 of FIGS. 1 and 2) may configure each NIC 302 of time synchronization server 350 to include a namespace for each of the VLANs, where each of the VLANs is associated with a particular customer network. For example, namespace 334A includes a virtual interface of VLAN 312A that is assigned to a physical port of NIC 302A and is mapped to timing daemon 304A that provides a first instance of the time synchronization service. Similarly, namespace 334B includes a virtual interface of VLAN 312B that is assigned to the physical port of NIC 302A and is mapped to timing daemon 304B that provides a second instance of the time synchronization service. Likewise, namespace 334M includes a virtual interface of VLAN 312M that is assigned to the physical port of NIC 302A and is mapped to timing daemon 304M that provides an Mth instance of the time synchronization service.

The number of VLANs configured on NIC 302A is limited due to hardware constraints. As the number of customer networks connected to the cloud exchange continue to scale, the programmable network platform may configure additional network interface cards, e.g., NIC 302B, of time synchronization server 300 with one or more VLANs for the additional customer networks. For example, the programmable network platform may configure NIC 302B with VLANs for each of the additional customer networks and configures namespaces for the VLANs to route time synchronization traffic between instances of the time synchronization service and the additional customer networks. For example, namespace 344A includes a virtual interface of VLAN 322A that is assigned to a physical port of NIC 302B and is mapped to timing daemon 306A that provides an instance of the time synchronization service. Similarly, namespace 344B includes a virtual interface of VLAN 322B that is assigned to the physical port of NIC 302B and is mapped to timing daemon 306B that provides another instance of the time synchronization service. Likewise, namespace 344N includes a virtual interface of VLAN 322N that is assigned to the physical port of NIC 302B and is mapped to timing daemon 306N that provides an Nth instance of the time synchronization service.

Figure 4:
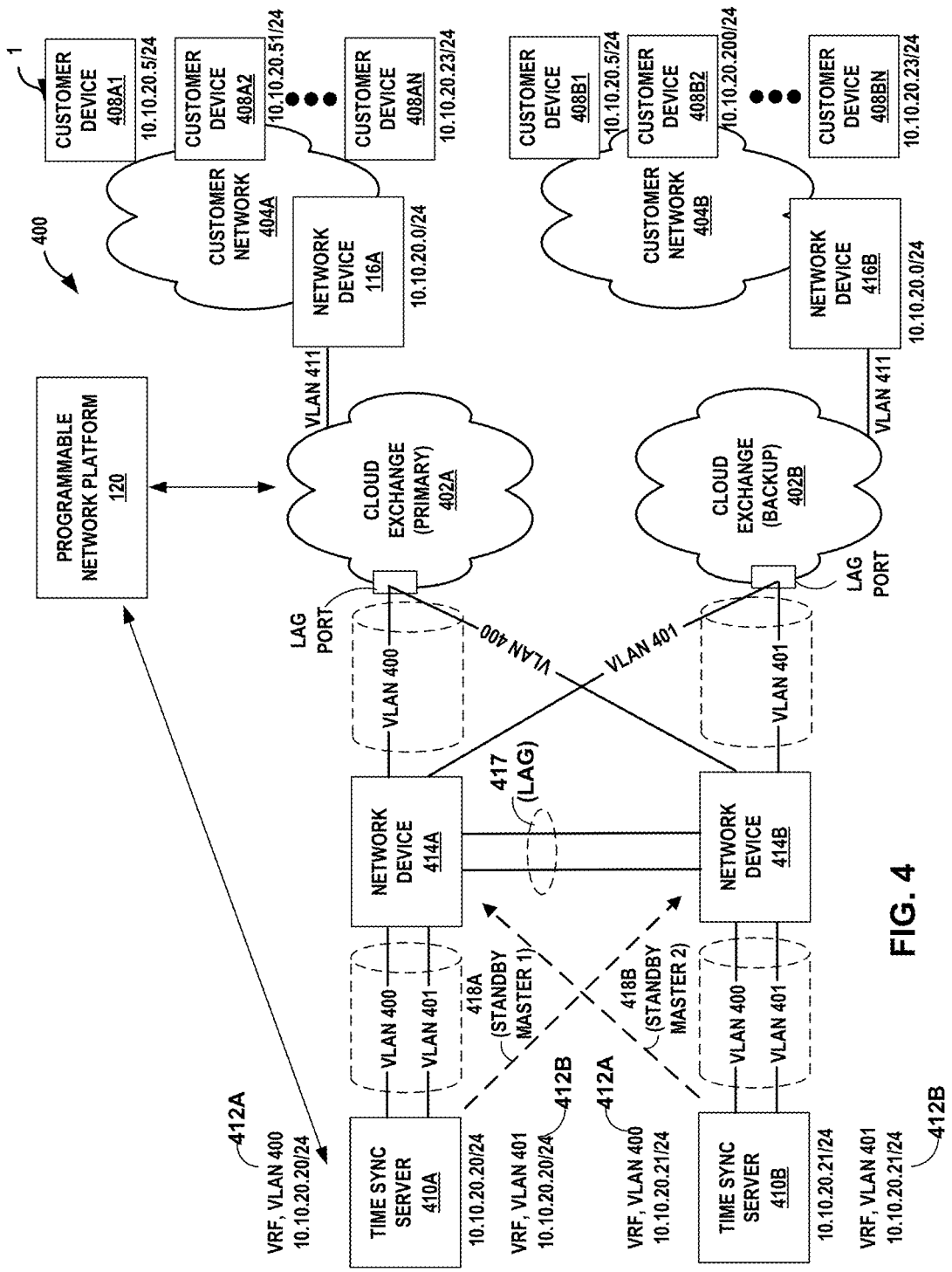
FIG. 4 is a conceptual diagram illustrating a redundant precision timing system, in accordance with one or more techniques of the current disclosure.

FIG. 4 is a conceptual diagram illustrating a redundant precision timing system, in accordance with one or more techniques of the current disclosure. Interconnection system 400 of FIG. 4 may include two redundant time synchronization master devices, e.g., primary time synchronization server 410A and backup time synchronization server 410B. Primary synchronization server 410A and backup time synchronization server 410B may each be configured to provide a time synchronization service, in accordance with the techniques as described above. In the example of FIG. 4, backup time synchronization server 410B may provide the time synchronization service in the event that primary time synchronization server 410A fails.

In this example, customer network 404A may be a primary network and customer network 404B may be a backup network. Customer devices 408A1-408AN (collectively, "customer devices 408A") of customer network 404A (e.g., primary network) may access the primary synchronization server 410A and backup synchronization server 410B via primary cloud exchange 402A. Similarly, customer devices 408B1-408BN (collectively, "customer devices 408B") of customer network 404B (e.g., backup customer network) may access the primary synchronization server 410A and backup synchronization server 410B via backup cloud exchange 402B.

Interconnection system 400 may include two redundant VLANs (e.g., VLAN 411) belonging to the customer, providing a primary connection and a backup connection to the time synchronization service via a primary cloud exchange 402A and a backup cloud exchange 402B, respectively. The customer may have a port assigned to each cloud exchange (e.g., illustrated in FIG. 4 as "LAG PORT"), and needs two virtual circuit connections to the time synchronization servers.

In the example of FIG. 4, when customer network 404A is onboarded to cloud exchange 402A, programmable network platform 120 may receive, from the customer, available IP addresses from the subnetwork of the customer that may be used to configure primary time synchronization server 410A and backup time synchronization server 410B. In this example, an administrator for customer network 404A may provide programmable network platform 120 with a first IP address of 10.10.20.20/24 and a second IP address of 10.10.20.21/24. In response, programmable network platform 120 may configure a primary time synchronization server 410A with the first IP address (e.g., 10.10.20.20/24) and configure a backup time synchronization server 410B with the second IP address (e.g., 10.10.20.21/24).

In the example of FIG. 4, programmable network platform 120 may configure VLAN 400 that is associated with the primary time synchronization server 410A, the backup time synchronization server 410B, and the primary customer network 404A. Programmable network platform 120 may configure primary time synchronization server 410A with VRF 412A associated with VLAN 400. Similarly, programmable network platform 120 may configure backup time synchronization server 410B with VRF 412A associated with VLAN 400.

Because routes to primary time synchronization server 410A and backup time synchronization server 410B are in the same VRF (e.g., VRF 412A), and associated with the same VLAN (e.g., VLAN 400), client devices may switch to backup time synchronization server 410B in the event primary time synchronization server 410A goes down. For example, with the customer devices 408A running the time synchronization protocol in multicast mode, the client devices may automatically detect backup time synchronization server 410B as the master device (e.g., using a best master clock algorithm). In this manner, customer devices 408A may automatically switch over to the backup time synchronization server.

In some examples, programmable network platform 120 may configure, for the backup connection, VLAN 401 that is associated with the primary time synchronization server 410A, the backup time synchronization server 410B, and the backup customer network 404B. Programmable network platform 120 may configure primary time synchronization server 410A with VRF 412B associated with VLAN 401. Similarly, programmable network platform 120 may configure backup time synchronization server 410B with VRF 412B associated with VLAN 401. In the event the primary connection goes down (e.g., cloud exchange 402A goes down), the customer network may access the time synchronization service provided by primary time synchronization server 410A or backup time synchronization server 410B using the backup connection.

Figure 5:
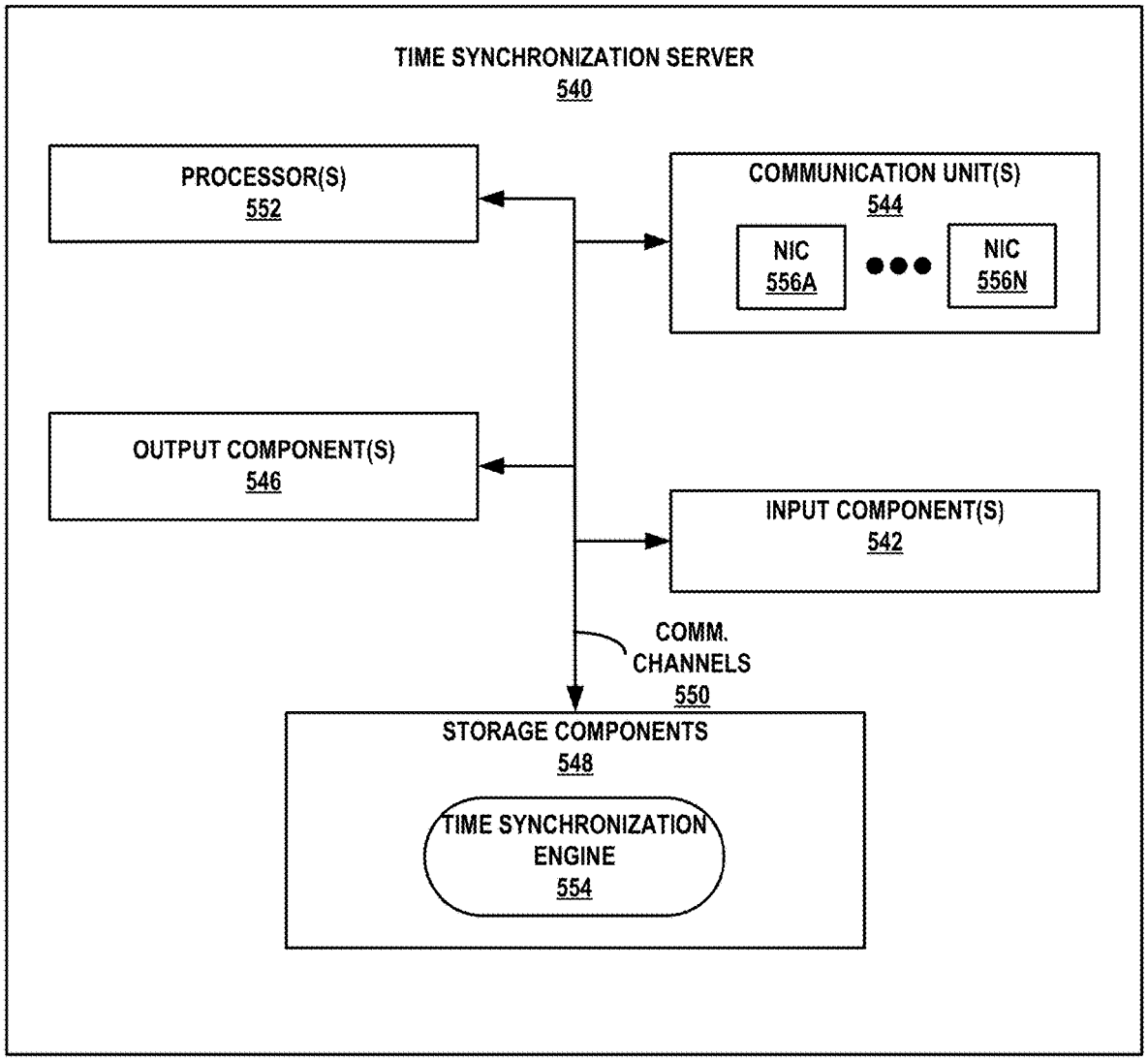
FIG. 5 is a block diagram of a more detailed view of a time synchronization server configured to perform one or more techniques in accordance with the current disclosure.

FIG. 5 is a block diagram of a more detailed view of a time synchronization server 540 configured to perform one or more techniques in accordance with the current disclosure. Time synchronization server 540 of FIG. 5 may represent an example implementation of time synchronization server 110 of FIG. 1, time synchronization server 202 of FIG. 2, time synchronization server 300 of FIG. 3A, time synchronization server 350 of FIG. 3B, and/or time synchronization servers 410A and 410B of FIG. 4. FIG. 5 illustrates only one example of time synchronization server 540, and many other examples of synchronization server 540 may be used in other instances and may include a subset of the components included in example time synchronization server 540 or may include additional components not shown in example time synchronization server 540 of FIG. 5.

As shown in the example of FIG. 5, time synchronization server 540 includes one or more processors 552, one or more input components 542, one or more communication units 544, one or more output components 546, and one or more storage components 548. Storage components 548 of time synchronization server 540 include time synchronization engine 554. Communication channels 550 may interconnect each of the components 542, 544, 546, 548, and 552 for inter-component communications (physically, communicatively, and/or operatively). In some examples, communication channels 550 may include a system bus, a network connection, an inter-process communication data structure, or any other method for communicating data.

One or more communication units 544 of time synchronization server 540 may communicate with external devices, via one or more wired and/or wireless networks by transmitting and/or receiving network signals on the one or more networks. Examples of communication units 544 include one or more network interface cards (e.g., NICs 556A-556N), such as an Ethernet card, an optical transceiver, a radio frequency transceiver, a GPS receiver, or any other type of device that can send and/or receive information. Other examples of communication units 544 may include short wave radios, cellular data radios, wireless network radios, as well as universal serial bus (USB) controllers.

One or more input components 542 of time synchronization server 540 may receive input. Examples of input are tactile, audio, and video input. Input components 542 of time synchronization server 540, in one example, includes a presence-sensitive input device (e.g., a touch sensitive screen, a PSD), mouse, keyboard, voice responsive system, video camera, microphone or any other type of device for detecting input from a human or machine. In some examples, input components 542 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 546 of time synchronization server 540 may generate output. Examples of output are tactile, audio, and video output. Output components 546 of time synchronization server 540, in one example, includes a PSD, sound card, video graphics adapter card, speaker, cathode ray tube (CRT) monitor, liquid crystal display (LCD), or any other type of device for generating output to a human or machine.

One or more processors 552 may implement functionality and/or execute instructions associated with time synchronization server 540. Examples of processors 552 include application processors, display controllers, auxiliary processors, one or more sensor hubs, and any other hardware configured to function as a processor, a processing unit, or a processing device. Time synchronization engine 554 may be operable by processors 552 to perform various actions, operations, or functions of time synchronization server 540. For example, processors 552 of time synchronization server 540 may retrieve and execute instructions stored by storage components 548 that cause processors 552 to perform the operations of time synchronization engine 554. The instructions, when executed by processors 552, may cause time synchronization server 540 to store information within storage components 548.

One or more storage components 548 within time synchronization server 540 may store information for processing during operation of time synchronization server 540 (e.g., time synchronization server 540 may store data accessed by time synchronization engine 554 during execution at time synchronization server 540). In some examples, storage component 548 is a temporary memory, meaning that a primary purpose of storage component 548 is not long-term storage. Storage components 548 on time synchronization server 540 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 548, in some examples, also include one or more computer-readable storage media. Storage components 548 in some examples include one or more non-transitory computer-readable storage mediums. Storage components 548 may be configured to store larger amounts of information than typically stored by volatile memory. Storage components 548 may further be configured for long-term storage of information as non-volatile memory space and retain information after power on or off cycles. Examples of non-volatile memories include magnetic hard discs, optical discs, floppy discs, flash memories, or forms of electrically programmable memories (EPROM) or electrically erasable and programmable (EEPROM) memories. Storage components 548 may store program instructions and/or information (e.g., data) associated with synchronization engine 554. Storage components 548 may include a memory configured to store data or other information associated with synchronization engine 554.

In accordance with the techniques of this disclosure, time synchronization engine 554 provides a time synchronization service using an exchange, in accordance with the techniques described in this disclosure. Time synchronization engine 554 may execute multiple time synchronization daemons or processes (e.g., PTP daemons and/or NTP daemons), where each of the time synchronization processes an instance of the time synchronization server for corresponding customer networks. Each of the time synchronization processes sends and receives timing packets through a corresponding VRF or namespace, where the VRF or namespace is associated with the corresponding customer network. As described above, time synchronization server 540 also includes hardware network interface cards (NICs) 556A-556N, which all of the timing packets sent and received by the master pass through. Hardware NICs each include a hardware clock and apply timestamps to the packets being sent or received that indicate the time according to the hardware clock.

In this manner, time synchronization server 540 can manage to isolate time synchronization traffic for each instance of the time synchronization service even though the customer networks may have overlapping IP addresses. Service providers may implement the techniques described herein as a service to customers to synchronize the clocks on customer devices. Time synchronization server 540 can provide the service to synchronize clocks on customer devices within a single data center or may synchronize customer devices located different geographical areas that are remote from one another. In some examples, some aspects of the techniques described herein may be implemented as a downloadable software plugin that executes on customer equipment, e.g., in a data center, and enables a computing system to perform the time synchronization processes as described herein. In some examples, a device similar to time synchronization server 540 (but performing client side functions) may correspond to customer equipment having a software plugin and/or network card installed that enables the receipt and ability to perform the client-side time synchronization actions based on the received timestamp offsets.

Figure 6:
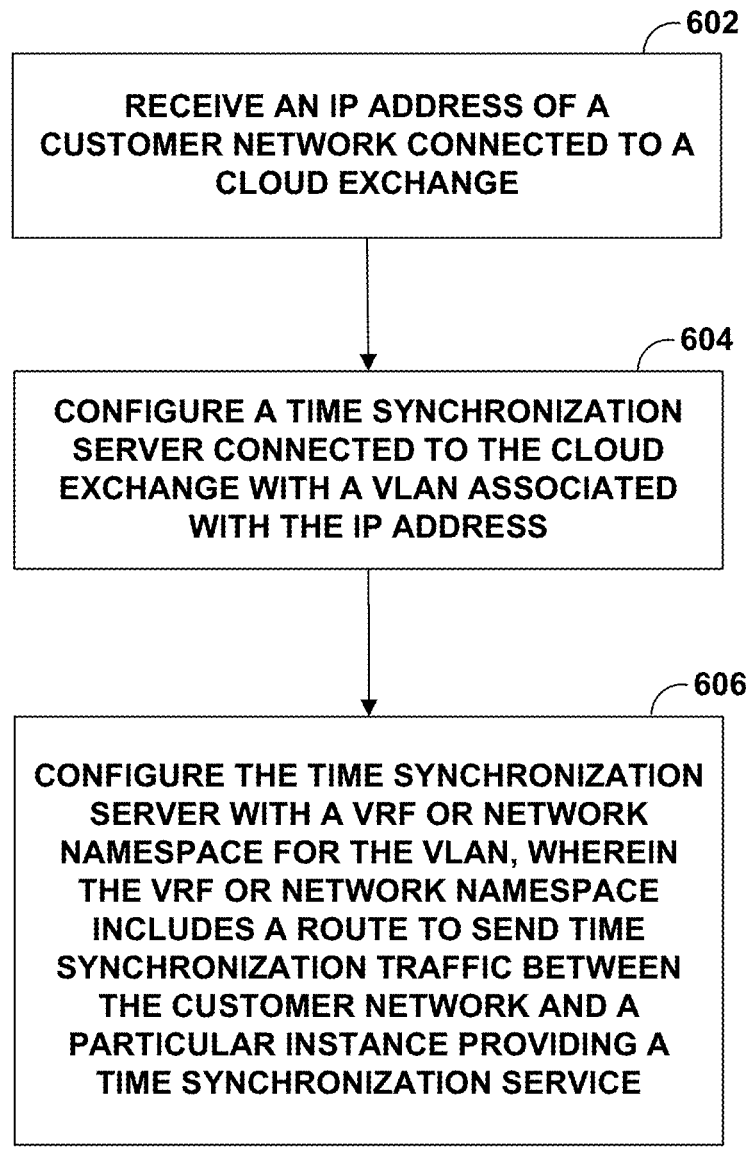
FIG. 6 is a flowchart illustrating an example operation of providing a time synchronization service using a cloud exchange, in accordance with the techniques described in this disclosure.

FIG. 6 is a flowchart illustrating an example operation of providing a time synchronization service using a cloud exchange, in accordance with the techniques described in this disclosure. The operation of FIG. 6 is described with respect to the programmable network platform of FIG. 1.

In the example of FIG. 6, programmable network platform 120 receives an IP address of a customer network of a plurality of customer networks connected to cloud exchange 102 administered by the programmable network platform (602). For example, an administrator for customer network 104A may provide programmable network platform 120 with an IP address of 10.10.20.20/24 for customer network 104A. Similarly, an administrator for customer network 104B may provide programmable network platform 120 with an IP address of 10.10.20.20/24 for customer network 104B.

In response to receiving the IP address of the customer network connected to cloud exchange 102, programmable network platform 120 configures time synchronization server 110 connected to cloud exchange 102 with a VLAN associated with the IP address of the customer network (604). For example, programmable network platform 120 may configure VLAN 200 for the IP address of customer network 104A and VLAN 201 for the IP address of customer network 104B. In this way, each VLAN may provide connectivity to a corresponding customer network while maintaining traffic isolation from other customer networks.

Programmable network platform 120 also configures the time synchronization server with a VRF or network namespace for the VLAN, wherein the VRF or network namespace includes a route to send time synchronization traffic between the customer network and a particular instance of the plurality of instances that provide the time synchronization service (606). For example, programmable network platform 120 may configure VRF 112A associated with VLAN 200 and VRF 112B associated with VLAN 201. Each of VRFs 112A and 112B includes one or more routes to send time synchronization traffic (e.g., PTP or NTP messages) for its associated VLAN. For example, a VRF may send time synchronization traffic for a VLAN that is associated with a particular customer network and a particular instance of the time synchronization service. For example, VRF 112A may include a route to send time synchronization traffic between a first timing process (e.g., timing daemon 304A of FIG. 3A) providing a first instance of the time synchronization service and customer network 104A. Similarly, VRF 112B may include a route to send time synchronization traffic between a second timing process (e.g., timing daemon 304B of FIG. 3A) providing a second instance of the time synchronization service and customer network 104B.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors comprising processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated.

What is claimed is:

1. A method comprising:
   receiving, by a programmable network platform executed by a computing device, an Internet protocol (IP)

address of a customer network of a plurality of customer networks connected to a cloud exchange administered by the programmable network platform;

configuring, by the programmable network platform, a time synchronization server connected to the cloud exchange with a Virtualized Local Area Network (VLAN) associated with the IP address of the customer network, the time synchronization server comprising one or more timing processes executed by the time synchronization server that provide a plurality of instances that provide a time synchronization service; and configuring, by the programmable network platform, the time synchronization server with a Virtual Routing and Forwarding (VRF) or a network namespace for the VLAN, wherein the VRF or the network namespace includes a route to send time synchronization traffic between the customer network and a particular timing process that provides a particular instance of the plurality of instances that provide the time synchronization service.

2. The method of claim 1, wherein the time synchronization service comprises a network time protocol (NTP) service.

3. The method of claim 1, wherein the time synchronization service comprises a precision time protocol (PTP) service.

4. The method of claim 1, wherein the customer network comprises a first customer network of the plurality of customer networks, wherein the particular instance comprises a first instance that provides the time synchronization service, wherein the VLAN comprises a first VLAN associated with an IP address of the first customer network, and wherein the VRF or the namespace comprises a first VRF or a first network namespace for the first VLAN, the method further comprising:

receiving, by the programmable network platform, an IP address of a second customer network of the plurality of customer networks connected to the cloud exchange, wherein the IP address of the first customer network and the IP address of the second customer network overlap;

configuring, by the programmable network platform, the time synchronization server with a second VLAN associated with the IP address of the second customer network; and configuring, by the programmable network platform, the time synchronization server with a second VRF or a second network namespace for the second VLAN, wherein the second VRF or the second network namespace for the second VLAN includes a route to send time synchronization traffic between the second customer network and a second instance of the plurality of instances that provide the time synchronization service.

5. The method of claim 1, wherein the IP address comprises a first IP address of the customer network, wherein the customer network comprises a first customer network of the plurality of customer networks, wherein the VRF or the network namespace comprises a first VRF or a first network namespace, wherein the time synchronization server comprises a first time synchronization server, wherein the plurality of instances comprises a first plurality of instances that provide the time synchronization service, the method further comprising:

receiving, by the programmable network platform, a second IP address of the customer network, wherein the first IP address of the customer network is used to configure the first time synchronization server and the second IP address of the customer network is used to configure a second time synchronization server for the customer network, wherein the VLAN is associated with the first IP address and the second IP address;

configuring, by the programmable network platform, the second time synchronization server with the VLAN associated with the first IP address of the customer network and the second IP address of the customer network, the second time synchronization server comprising a second plurality of instances that provide the time synchronization service; and configuring, by the programmable network platform, the second time synchronization server with a second VRF or a second network namespace for the VLAN, wherein the second VRF or the second network namespace includes a route to send, if the first time synchronization server fails, time synchronization traffic between the customer network and a particular instance of the second plurality of instances that provide the time synchronization service.

6. A computing device comprising:

one or more computer processors; and a memory comprising instructions that when executed by the one or more computer processors cause the one or more computer processors to:

receive an Internet protocol (IP) address of a customer network of a plurality of customer networks connected to a cloud exchange;

configure a time synchronization server connected to the cloud exchange with a Virtualized Local Area Network (VLAN) associated with the IP address of the customer network, the time synchronization server comprising one or more timing processes executed by the time synchronization server that provide a plurality of instances that provide a time synchronization service; and configure the time synchronization server with a Virtual Routing and Forwarding (VRF) or a network namespace for the VLAN, wherein the VRF or the network namespace includes a route to send time synchronization traffic between the customer network and a particular timing process of the one or more timing processes that provides a particular instance of the plurality of instances that provide the time synchronization service.

7. The computing device of claim 6, wherein the time synchronization service comprises a network time protocol (NTP) service.

8. The computing device of claim 6, wherein the time synchronization service comprises a precision time protocol (PTP) service.

9. The computing device of claim 6, wherein the customer network comprises a first customer network of the plurality of customer networks, wherein the VLAN comprises a first VLAN associated with an IP address of the first customer network, wherein the VRF or the network namespace comprises a first VRF or a first network namespace for the first VLAN, and wherein the particular instance comprises a first instance that provides the time synchronization service, the instructions further causing the one or more computer processors to:

receive an IP address of a second customer network of the plurality of customer networks connected to the cloud exchange, wherein the IP address of the first customer network and the IP address of the second customer network overlap;
configure the time synchronization server with a second VLAN associated with the second IP address of the second customer network; and
configure the time synchronization server with a second VRF or a second network namespace for the second VLAN, wherein the second VRF or the second network namespace includes a route to send time synchronization traffic between the second customer network and a second instance of the plurality of instances that provide the time synchronization service.

10. The computing device of claim 6, wherein the IP address comprises a first IP address of the customer network, wherein the VRF or the network namespace comprises a first VRF or a first network namespace, wherein the time synchronization server comprises a first time synchronization server, wherein the plurality of instances comprises a first plurality of instances that provide the time synchronization service, the instructions further causing the one or more computer processors to:
receive a second IP address of the customer network, wherein the first IP address is used to configure the first time synchronization server and the second IP address is used to configure a second time synchronization server for the customer network, wherein the VLAN is associated with the first IP address and the second IP address;
configure the second time synchronization server with the VLAN associated with the first IP address and the second IP address of the customer network, the second time synchronization server comprising a second plurality of instances that provide the time synchronization service; and
configure the second time synchronization server with a second VRF or a second network namespace for the VLAN, wherein the second VRF or the second network namespace includes a route to send, if the first time synchronization server fails, time synchronization traffic between the customer network and a particular instance of the second plurality of instances that provide the time synchronization service.

11. The computing device of claim 6, wherein each of the one or more timing processes comprises a corresponding daemon.

12. An interconnection system comprising:
a plurality of customer networks connected to a cloud exchange; and
a time synchronization server connected to the cloud exchange, the time synchronization server comprising:
one or more timing processes executed by the time synchronization server that provide a plurality of instances that provide a time synchronization service;
a Virtualized Local Area Network (VLAN) associated with an Internet protocol (IP) address of a particular customer network of the plurality of customer networks; and
a Virtual Routing and Forwarding (VRF) or a network namespace for the VLAN, wherein the VRF or the network namespace includes a route to send time synchronization traffic between the particular customer network and a particular timing process of the one or more timing processes that provides a particular instance of the plurality of instances that provide the time synchronization service.

13. The interconnection system of claim 12, wherein the time synchronization service comprises a network time protocol (NTP) service.

14. The interconnection system of claim 12, wherein the time synchronization service comprises a precision time protocol (PTP) service.

15. The interconnection system of claim 12, wherein the particular customer network comprises a first customer network of the plurality of customer networks, wherein the particular instance comprises a first instance that provides the time synchronization service, wherein the VLAN comprises a first VLAN associated with an IP address of the first customer network, wherein the VRF or the namespace comprises a first VRF or a first namespace for the first VLAN, and wherein the time synchronization server further comprises:
a second VLAN associated with an IP address of a second customer network of the plurality of customer networks connected to the cloud exchange, wherein the IP address of the first customer network and the IP address of the second customer network overlap; and
a second VRF or a second network namespace for the second VLAN, wherein the second VRF or the second network namespace for the second VLAN includes a route to send time synchronization traffic between the second customer network and a second instance of the plurality of instances that provide the time synchronization service.

16. The interconnection system of claim 12, wherein the IP address comprises a first IP address of the particular customer network, wherein the time synchronization server comprises a first time synchronization server, wherein the plurality of instances comprises a first plurality of instances that provide the time synchronization service, the interconnection system further comprising:
a second time synchronization server comprising a second plurality of instances that provide the time synchronization service, wherein the second time synchronization server comprises:
the VLAN, wherein the VLAN is associated with the first IP address of the particular customer network and a second IP address of the particular customer network; and
a second VRF or a second network namespace for the VLAN, wherein the second VRF or the second network namespace includes a route to send time synchronization traffic between the particular customer network and a particular instance of the second plurality of instances that provide the time synchronization service.

17. The interconnection system of claim 12, further comprising:
a programmable network platform configured to:
receive the IP address of the particular customer network;
configure the time synchronization server with the VLAN associated with the IP address of the particular customer network; and
configure the time synchronization server with the VRF or network namespace for the VLAN.

* * * * *